R. S. MIX.
HARROW SHOE.
APPLICATION FILED MAY 28, 1919.
1,342,454.
Patented June 8, 1920.
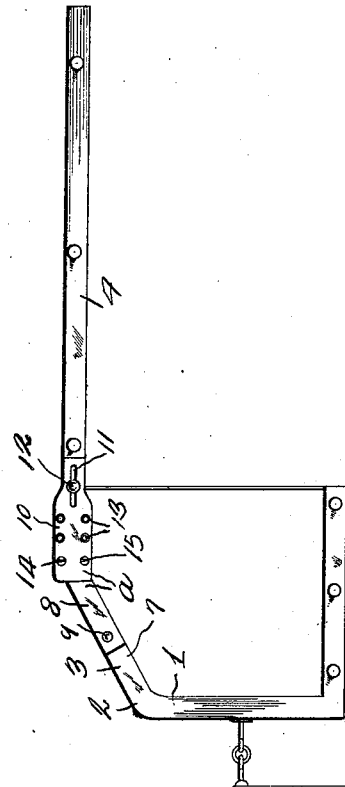
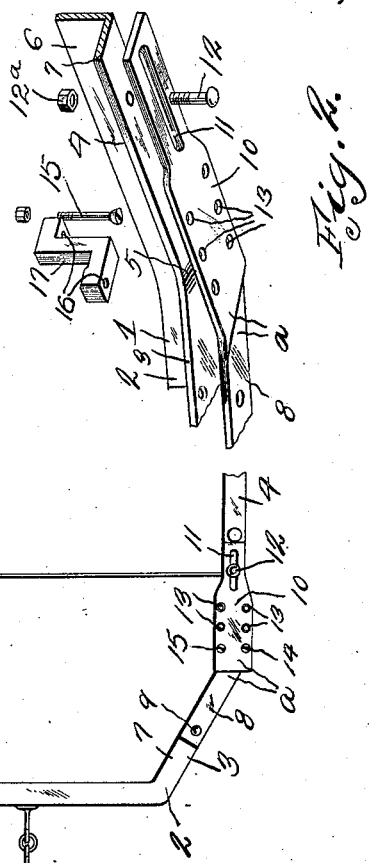
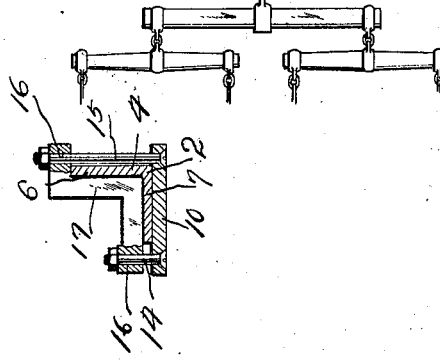
Inventor
R. S. Mix
by D. Swift
his
Attorney

UNITED STATES PATENT OFFICE.

ROBERT S. MIX, OF COHOCTON, NEW YORK.

HARROW-SHOE.

1,342,454.   Specification of Letters Patent.   Patented June 8, 1920.

Application filed May 23, 1919. Serial No. 300,248.

*To all whom it may concern:*

Be it known that I, ROBERT S. MIX, a citizen of the United States, residing at Cohocton, in the county of Steuben, State of New York, have invented a new and useful Harrow-Shoe; and I do hereby declare the following to be a full, clear, and exact description of the invention, such as will enable others skilled in the art to which it appertains to make and use the same.

The invention relates to harrows and has for its object to provide a harrow shoe, which harrow shoe may be easily and quickly adjusted and secured to the under face of a drag, said shoe being adapted to engage the ground as the harrow drag moves over the same, thereby preventing the wearing out of the drag bar. Also to so secure and construct the shoe that the same may be easily and quickly adjusted longitudinally on the drag as said shoe becomes worn.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a bottom plan view of a conventional form of harrow showing the drag shoes applied thereto.

Fig. 2 is a detail perspective view of the shoe and its adjacent parts, showing the same in positions to be assembled.

Fig. 3 is a sectional view through the forward end of the shoe, showing the means for adjustably securing the same to the drag frame.

Referring to the drawings, the numeral 1 designates a conventional form of harrow, which comprises the drag frames 2, said drag frames 2 being formed with outwardly and rearwardly extending bars 3, which bars terminate in longitudinal bars 4 in parallel relation to each other. Where the bars 3 merge into the bars 4, a shoulder 5 is formed. In the harrows now in use the wear upon the drag frames 2 is substantially at the points 5, this for the reason that the bars 3 extend slightly upwardly, therefore the shoulders 5 contact with the ground and become worn. Each of the drag frames is made from angle iron and has an upwardly extending flange 6 also a horizontal flange 7. Secured to the flange 7 of the bar 3 is a wear plate 8, which wear plate may be riveted or otherwise secured as at 9 to said bar.

An adjustable shoe 10 is securely clamped to the bar 4 of each drag 2. One end of said shoe is provided with an elongated slot 11, and through this slot a bolt 12 passes, said bolt having a nut 12ª thereon by means of which the shoe 10 may be securely clamped to the bar 4. The forward end of the shoe 10 is preferably wider than the width of the frame of the drags, however, its marginal edges being provided with a series of apertures 13, through which apertures bolts 14 and 15 are adapted to pass, said bolts in turn passing through apertures 16 of brackets 17, which brackets are adapted to engage the upper and inner faces of the flanges 6 and 7.

Through constant use of the harrow the plates 8 and 10 become worn as at *a*. However, as the wear reduces the ends to a sharp edge, the adjustable plate 10 is moved forwardly so as to overlap the end of the plate 8, this being accomplished by moving the bracket 17 and its securing bolts into engagement with apertures 13 near the rear of the adjustable shoe, and then loosening up on the bolt 12 and adjusting the wear plate to any desired position, after which the clamping means are again secured.

It will be seen that a shoe forming a wear plate is provided which may be cheaply constructed and one wherein the wearing out of drag frames will be prevented.

The invention having been set forth what is claimed as new and useful is:—

1. A wear plate shoe for harrows, said shoe comprising an elongated metallic member, means whereby said shoe may be secured to the under face of a harrow drag and said securing means allowing longitudinal adjustment of said shoe as desired.

2. A wear plate shoe for harrows, said shoe comprising an elongated metallic member, one end of said member being provided with an elongated slot, means passing through said slot, whereby said wear plate may be clamped in various longitudinal positions, and means carried by the forward end of the wear plate and arching the frame of the drag.

3. A wear plate shoe for harrows, said shoe comprising an elongated metallic member, one end of said member being provided with an elongated slot, means passing through said slot whereby said wear plate may be clamped in various longitudinal positions, means carried by the forward end of the wear plate and arching the frame of the drag for securing said end to the drag frame, and means whereby said arching member may be moved rearwardly and secured to the wear plate as the forward end of said wear plate is worn away and said plate moved forwardly into position.

In testimony whereof I have signed my name to this specification in the presence of two subscribing witnesses.

ROBERT S. MIX.

Witnesses:
C. R. GIFFORD,
CHAS. E. CAVELY.